June 17, 1930.  H. HERZFELD  1,764,448
EDUCATIONAL APPLIANCE
Filed Nov. 7, 1927
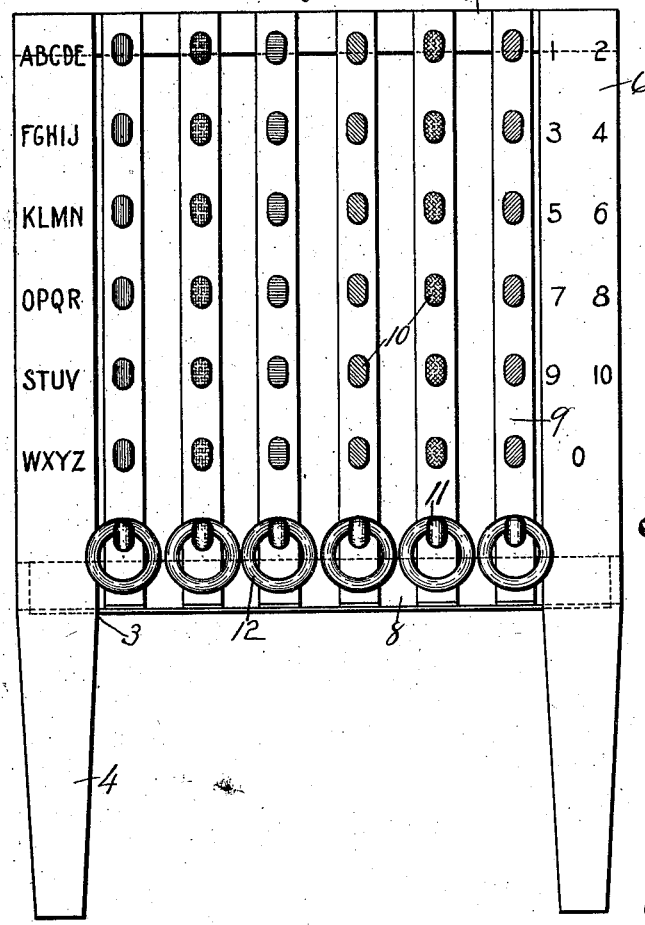
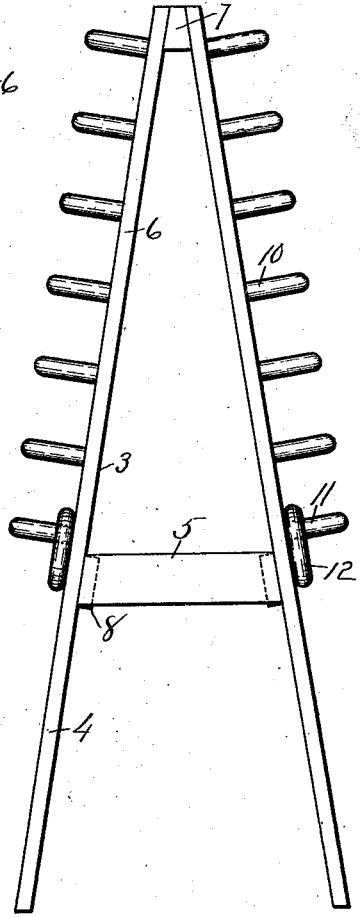
INVENTOR
Harry Herzfeld.
By Arthur B. Jenkins.
ATTORNEY Patented June 17, 1930

1,764,448

UNITED STATES PATENT OFFICE

HARRY HERZFELD, OF HARTFORD, CONNECTICUT

EDUCATIONAL APPLIANCE

Application filed November 7, 1927. Serial No. 231,470.

My invention relates to the class of devices employed for teaching, more especially a child, the alphabet, numerals, and particularly colors, and an object of my invention, among others, is to provide a device of this class by means of which such things may be readily taught.

One form of appliance embodying my invention and in the construction and use of which the objects herein set out, as well as others, may be attained, is illustrated in the accompanying drawings, in which—

Figure 1 is a view in front elevation of my improved appliance.

Figure 2 is an end view of the same.

An important feature of my invention is an appliance that may be employed as a source of amusement to the child and which will stimulate a desire on its part to play with the device and, therefore, gain knowledge therefrom.

In the accompanying drawings the numeral 3 indicates a frame supported as by legs 4, there being preferably two of these frames secured together at their upper ends and diverging downwardly in the form of an easel, and this frame may comprise braces 5 located between the top and bottom of the structure as a whole. The frame comprises sides 6 that may be of considerable width and which may have displayed thereon the alphabet on one side and numerals on the opposite side, cross bars 7—8 at the top and bottom respectively connecting the sides 6.

Peg supporting bars 9 are secured to the top and bottom cross bars and pegs or hangers 10 are mounted in rows on said bars. Ring supporting pins 11 are secured to the bars 9 near the bottom thereof for the support of rings 12.

The pegs or hangers 10 are colored, preferably all of the pegs in each row being of the same color. Any desired color may be employed, as shown herein, the colors designated being red, yellow, blue, green, orange and purple from left to right.

An important feature of the invention is to teach a child the colors and in doing this the child may be told to take a ring from one of the pins 11 and place it on a peg or hanger of a certain color, and in this way the child will soon be able to distinguish the different colors.

In a like manner the child may be told to take a ring from one of the pins and place it on a peg or hanger opposite certain letters or numerals, and in this way it will soon familiarize itself with the different letters and numerals.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. An educational appliance including a frame formed with parallel bars, pegs arranged in rows on said bars, each row of pegs being of a color different from that of another row, and rings adapted to be interchangeably placed upon said pins and pegs.

2. An educational appliance including a frame having side parts, alphabetical letters placed upon one of said sides and numerals placed upon the other of said sides, pegs arranged in rows crosswise of the frame between said letters and numerals, and rings adapted to be placed upon said pegs.

3. An educational appliance including a frame having side parts, bars extending between said side parts, pegs arranged in vertical rows in each of said bars and in rows crosswise of the frame, alphabetical letters and numerals placed opposite the crosswise rows of pegs, each vertical row of pegs being of a color different from that of another vertical row, and rings adapted to be interchangeably placed upon said pins and pegs.

4. An educational appliance including a frame having side parts, bars positioned between said side parts, pegs arranged in vertical rows in each of said bars and in rows crosswise of the frame, alphabetical letters and numerals placed opposite the crosswise rows of pegs, each vertical row of pegs being of a color different from that of another vertical row, and rings adapted to be placed on said pegs.

HARRY HERZFELD.